Jan. 8, 1963 E. HÄUSSERMANN 3,072,749

DIAL ARRANGEMENT FOR TELEPHONE SETS AND LIKE DEVICES

Filed Dec. 17, 1958

INVENTOR:
ERICH HÄUSSERMANN
BY [signature] AGT.

3,072,749
Patented Jan. 8, 1963

3,072,749

DIAL ARRANGEMENT FOR TELEPHONE SETS AND LIKE DEVICES

Erich Häussermann, St. Getreu Str. 47, Bamberg, Germany

Filed Dec. 17, 1958, Ser. No. 781,095
Claims priority, application Germany May 16, 1958
4 Claims. (Cl. 179—90)

The present invention relates to selector or dial mechanisms for telephones and like devices.

It is an object of the present invention to provide means implementing telephone dial mechanisms of greatly simplified structure, which are easy to manipulate and faster in operation than heretofore known prior art mechanisms.

It is another object of the present invention to provide means contriving a very efficacious dial mechanism which during operation is easily accessible to and well-arranged for a telephone user than those heretofore employed and which is more practical in construction, operation and use.

It is another object of the present invention to provide means redounding to a handy and easily operable telephone dial mechanism which practically eliminates during operation the possibility of dialing incorrect numbers.

It is a further object of the present invention to provide means preventing undesirable lateral displacement or shifting of the base of the telephone during dialing operations.

Yet a further object of the invention resides in the provision of means affording an arrangement of two or more divisional dial or selector mechanisms in juxtaposition and in a symmetric fashion permitting easy survey of the operation thereof.

These and other objects of the invention will become further apparent from the following detailed description, reference being made to the accompanying drawing, showing preferred embodiments of the invention.

Conventional dial mechanisms for telephone handsets comprise a perforated disk which is partially rotated, each rotation being limited by a stop, and which, when released, is returned to its initial position by a return spring. Each partial rotation energizes a pulse transmitter which, in turn, acts on known electrical switching means to establish according to the telephone number being dialed the respective connection.

Pursuant to the present invention, a rectilinearly operable dial device is utilized instead of the rotary dial disk. When a number is dialed employing a device pursuant to the present invention, the finger pressure is exerted always toward the base surface of the handset so that the handset base is not moved by finger pressure, as in the case of a rotary dial disk, and the annoying rotary movement of the latter is eliminated.

A stop is provided for the longitudinal displacement of the dialing mechanism, which is similar to that used for perforated disks. Suitable means are provided to transmit the mechanical movements to a pulse transmitter to activate the latter in accordance with the number being dialed.

For example, a rack and gear mechanism may be utilized for this purpose, the movements of the gear acting, directly or indirectly, to energize the pulse transmitter.

Other friction means can be utilized in lieu of a rack and gear, for example, tackle, chains and counter means, etc. In addition, the construction may be such that the pulse transmitter may be directly activated by the rectilinear movements.

The rectilinearly operable dial mechanism of the present invention returns to its initial or rest position after the desired telephone number has been dialed. This can be effected by a spring or similar means.

The dialing mechanism can be arranged perpendicular to or at another angle to the base surface of the handset apparatus. In a wall set, for example, the dialing mechanism may be arranged horizontally, with the mechanism being laterally operable for dialing.

In lieu of finger holes, the rectilinearly operable dialing device may utilize trough-shaped finger stalls or grooves, or readily graspable or engageable pins.

The rectilinearly or longitudinally dialing device may comprise a raised ledge or a band formed of plastic or other suitable material, which has the required number of finger holes and which is slidable in a lateral or central guide means. Combinations of suitable materials may be utilized for the ledge or band. For example, a rubber coated textile, such as used for a conveyor belt, may be used for the band.

Figure 1:
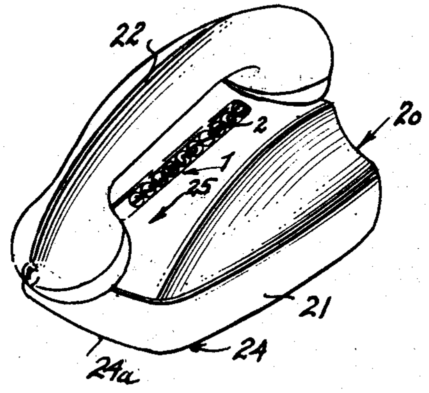
FIGS. 1 and 2 are perspective views of two embodiments of telephone handsets pursuant to the present invention.
Figures 3, 4:
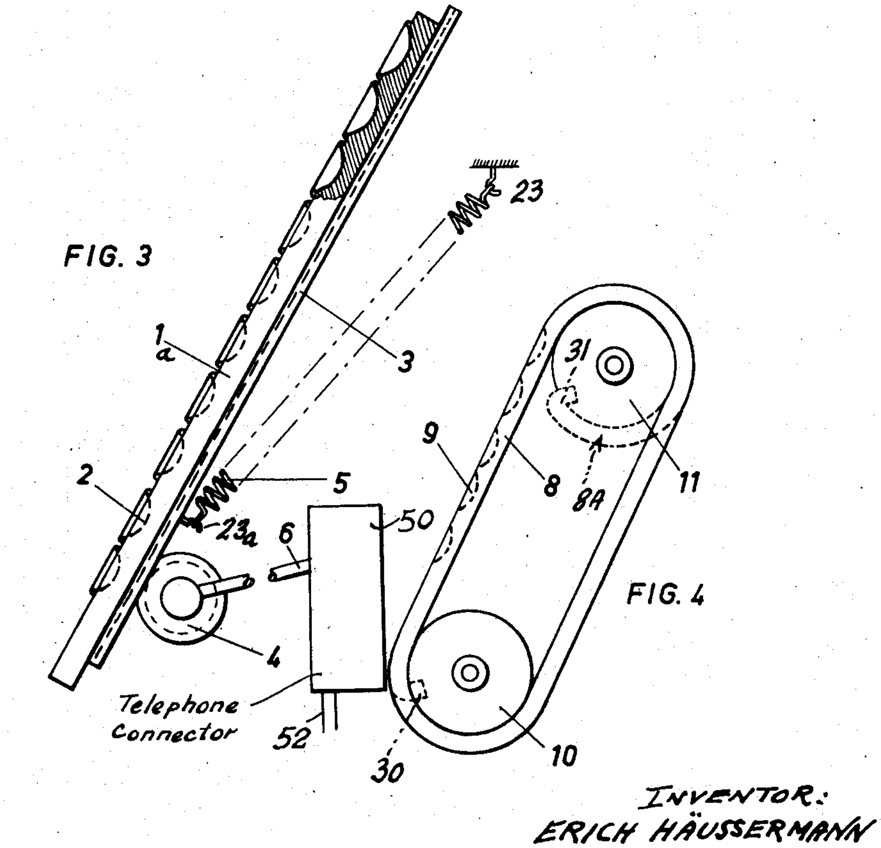
FIG. 3 is a fragmentary side view, partially in section and on an enlarged scale, of the dial mechanism of the handset illustrated in FIG. 1.
FIG. 4 is a schematic side view, on an enlarged scale, of a twin dial mechanism in the handset illustrated in FIG. 2.

The dial numbers can be provided directly in, or adjacent to, finger holes, as in conventional rotary disks. For example, as shown in FIG. 1, there is provided a telephone hand set 20, pursuant to the present invention, which comprises a base 21 on which there is removably mounted a conventional hand piece 22 which is provided with both a receiver and a transmitter. As here shown, the base 21 is provided with a rectilinear dialing mechanism 1, which is best shown in FIG. 3. The mechanism or dial ledge 1*a* comprises preferably a raised ledge formed of plastic or other suitable material in which there are formed ten finger recesses or grooves 2, which are suitably numbered in successively ascending numerical order, as shown in FIG. 1.

The ledge 1*a* is guided for longitudinal rectilinear reciprocation in suitable laterally related guides, or on a central guide of conventional construction (not illustrated). The dialing ledge 1*a* is secured to a rack 3 which meshes with a cooperating gear 4. The gear 4 is provided with a conventional motion transmitting lever 6, which in turn is connected to a pulse transmitter in a telephone connecting device 50 for activating a selected line of a multiplicity of lines 52 emanating from the latter in response to the rectilinear movements of the dialing mechanism 1. A return tension spring 5 has one end anchored as at 23, and the other end is tied to the rack 3, as at 23*a*, to return the dialing device 1 to the rest position thereof, after each dialing movement.

In order to prevent too long a sliding movement of the band or ledge 1, its ends can be refluxed or coiled. In addition, a conventional finger stop is provided to limit each rectilinear dial movement. As best seen in FIG. 1, the hand piece 22 overlies the dial device 1, the dialing movements being in lengthwise direction toward the forward end 24*a* of the bottom 24 of the base 21, as shown by arrow 25.

Figure 2:
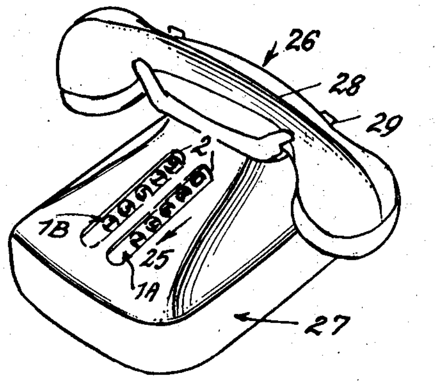

Referring now to FIG. 2, in detail, there is shown a modification of the embodiment illustrated in FIG. 1. According to FIG. 2, there is provided a hand set 26 comprising a base 27 and a conventional hand receiver piece 28 seated on a conventional cradle or hook-shaped switch 29 provided on and movable relative to the base.

Pursuant to the present modification, the maximum sliding distance of the dial device 1 in FIG. 1 is greatly reduced. This is accomplished by providing two separate dial devices 1A and 1B mounted in lateral relation on the base 27. Each device 1A and 1B is constructed and operates in the same manner as the single device 1, except that it has five finger recesses 2 in lieu of the ten finger recesses provided in device 1. As shown in FIG. 2, the left hand device 1A has the odd-numbered finger recesses 1, 3, 5, 7 and 9, and the right hand device 1B has the even numbered finger recesses 2, 4, 6, 8 and zero.

Pursuant to another embodiment of the invention, an endless self-contained band 8, as shown in FIG. 4, is utilized for the longitudinally displaceable dialing means, The band is provided with the finger recesses 9 which are suitably numbered in the same manner as in FIGS. 1 and 2. The band 8 is mounted on a pair of spaced rollers 10 and 11 and is guided thereon thereby or with the aid of additional conventional guide means. The rollers are connected with one or more conventional pulse transmitters, as by means of motion transmitting means 6, as in FIG. 3.

Instead of an endless belt or band, a suitable finite flexible band 8A, may be used, as shown in broken lines in FIG. 4. The band 8A terminates in the opposite ends 30, 31, which are secured to the spaced rollers 10, 11, respectively. The band 8A is provided with suitable finger recesses 9. In either the case of band 8 or 8A, the rotation of only one roller can be used to transmit the band movements to the pulse transmitter. In both cases, suitable return means operative on or within a roller can be used to return the band to its rest or starting position. By using two bands, arranged side by side, a smaller band length may be achieved. Luminous numerals may be provided in the bands, as well as in the ledges.

In all of the embodiments shown and described herein, the longitudinally displaceable dial device may have a convex or concave curvature in longitudinal or in transverse direction.

It is also within the scope of the present invention to use a longitudinally displaceable dialing means guide, for example, on two rolls and wound by them. A return means would be provided for the two rolls which would act in opposite directions, so that the band is always stretched therebetween.

In all embodiments, the preferred direction of movement is longitudinal and the numbers or other indicia are arranged facing the person operating the dial which should be clearly visible and accessible to him.

Various changes and modifications may be made without departing from the spirit and scope of the present invention and it is intended that such obvious changes and modifications be embraced by the annexed claims.

Having thus described the invention, what is claimed as new and desired to be secured by Letters Patent, is:

1. A dialing mechanism for a telephone apparatus having means for connecting the telephone to one of a multiplicity of lines in accordance with a dialed number, comprising a housing having an elongated slot opening, a roller located adjacent each end of said slot opening and rotatably mounted in said housing, means on at least one of said rollers for activating the connecting means in accordance with the amount of rotation of said roller and for returning said roller to an initial position, and a flexible band extending to at least the periphery of said rollers and disposed in alignment with said slot and arranged to rotate said rollers in accordance with the displacement of said band to an edge of said slot, said band having a plurality of finger engaging means defined along the length thereof each provided with indicia for indicating a telephone digit, said band being displaceable by engaging the finger in a selected engaging means and moving the band until the finger contacts the edge of the slot to activate the connecting means in an amount comparable to the movement of the digit groove selected said band being movable back to its original position upon release by said returning means on said roller, said means on at least one of said rollers for activating the connecting means being influenced in proportion to the digit selected each time a selected one of said finger engaging means is displaced to the edge of said slot to complete the dialing of a telephone number.

2. A dialing mechanism according to claim 1, including a second slot, a second roller set including a roller mounted adjacent each end of said second slot and a second flexible band extending to at least the peripheries of said second rollers and arranged to rotate said second rollers in accordance with displacement of said second band, said second band also including grooved portions having indicia thereon defined along the length thereof.

3. A dialing mechanism according to claim 2, wherein one of said bands includes odd numbered digits and the other of said bands includes even numbered digits.

4. A dialing mechanism according to claim 1, wherein said flexible band is an endless band extending around each of said rollers.

References Cited in the file of this patent

UNITED STATES PATENTS

| | | |
|---|---|---|
| 1,251,495 | Forsberg | Jan. 1, 1918 |
| 1,478,419 | Bailey | Dec. 25, 1923 |
| 1,859,622 | Fitch | May 24, 1932 |
| 2,060,371 | Hilgers | Nov. 10, 1936 |
| 2,503,542 | Brander | Apr. 11, 1950 |

FOREIGN PATENTS

| | | |
|---|---|---|
| 1,120,992 | France | Apr. 23, 1956 |